United States Patent [19]

Edminster

[11] Patent Number: 5,052,303

[45] Date of Patent: Oct. 1, 1991

[54] INTERLOCKED RELEASE MECHANISM WITH TIMED, SEQUENTIAL RELEASE STEPS

[75] Inventor: Robert E. Edminster, Scottsdale, Ariz.

[73] Assignee: Motorola, Inc., Schaumburg, Ill.

[21] Appl. No.: 516,953

[22] Filed: Apr. 30, 1990

[51] Int. Cl.⁵ .................. F42C 15/00; F16H 55/00
[52] U.S. Cl. .................. 102/254; 102/221; 74/130; 74/422; 74/435
[58] Field of Search ........... 74/130, 126, 435, 422, 74/1.5; 102/221, 222, 254

[56] References Cited

U.S. PATENT DOCUMENTS

| | | | |
|---|---|---|---|
| 4,090,410 | 5/1978 | Nakamura | 74/435 |
| 4,188,885 | 2/1980 | Wolf et al. | 102/221 |
| 4,286,522 | 9/1981 | Trayner | 102/222 |
| 4,615,269 | 10/1986 | Holder | 102/221 |
| 4,790,246 | 12/1988 | Hälssig et al. | 102/254 |
| 4,793,257 | 12/1988 | Bolieau | 102/221 |
| 4,854,183 | 8/1989 | Periou et al. | 74/435 |

*Primary Examiner*—David H. Brown
*Attorney, Agent, or Firm*—Frank J. Bogacz; Jordan C. Powell

[57] ABSTRACT

An interlocking release mechanism uses a toothed pinion engaging a toothed rack or gear. The teeth of the pinion are removed in certain areas so as a lock arm, when moved axially from in alignment with a tooth segment to where the tooth has been removed, permits the pinion to be rotated by the rack. The rack and the lock arm must be operated in the correct sequence or the lock arm will be jammed. With the correct sequence of lock arm motion and pinion rotation by the rack or gear, the rack or gear may be moved to achieve the desired release action of the subject invention.

15 Claims, 5 Drawing Sheets

INTERLOCKED RELEASE MECHANISM WITH TIMED, SEQUENTIAL RELEASE STEPS

The following invention relates to U.S. application Ser. No. 456,396 having the same inventor and same assignee.

BACKGROUND OF THE INVENTION

This invention relates to mechanical safety devices and move specifically, to release mechanisms incorporating interlocks with timed, sequential release steps.

Fuzes that initiate Department of Defense high explosive military munitions must comply with strict safety requirements including MIL-STD-1316, Safety Criteria for Fuze Design. The fire train of a fuze used for high explosive bombs typically uses an electrically ignited detonator which successively ignites a lead charge, a booster and then the relatively insensitive main charge of the bomb. The detonator is held out of line with the lead charge in the "safe" position until at "arm" time it is moved in line with the lead charge. MIL-STD-1316 requires that two independent mechanical locks be used to hold the detonator in the "safe", out of line position.

A safe and arm mechanism has been invented that incorporates one independent mechanical lock. This device is described in a U.S. patent application by the same inventor as the present invention and assigned to the same assignee and entitled SAFE AND ARM DEVICE having Ser. No. 456,396. The purpose of the subject invention herein described is to provide a second dependent lock for such a safe and arm device or other mechanism requiring an interlocked mechanism with timed, sequential release steps. This lock mechanism must operate without compromise from random electrical pulses or shock or vibration.

SUMMARY OF THE INVENTION

Accordingly, it is an object of the present invention to provide a simple, inexpensive yet safe and reliable interlocked release mechanism. Power to operate this mechanism in the case illustrated is by an electrically operated solenoid. Power in other applications may be provided by other means such as pneumatic, hydraulic or mechanical action. Military aircraft delivered munitions use electric power generated by a miniature wind driven generator mounted on the munition. Tactical maneuvers of today's military aircraft require this power to be generated in less than 1.5 seconds and the amount of power available from the small turbine in this short time period is in the order of one watt second. The safe and arm device and its associated interlocks must therefore be very small and power efficient.

The subject device provides the second, redundant, lock by requiring several separate, timed, sequential actions for release. These actions are not compromised by random electrical pulses or from shock or vibration. The lock must be moved by a fuze out-of-line-mechanism after an electrically operated solenoid releases the lock in a timed sequence.

DETAILED DESCRIPTION OF THE INVENTION

The teachings of U.S. application Ser. No. 456,396 are hereby incorporated by reference.

Figure 2:
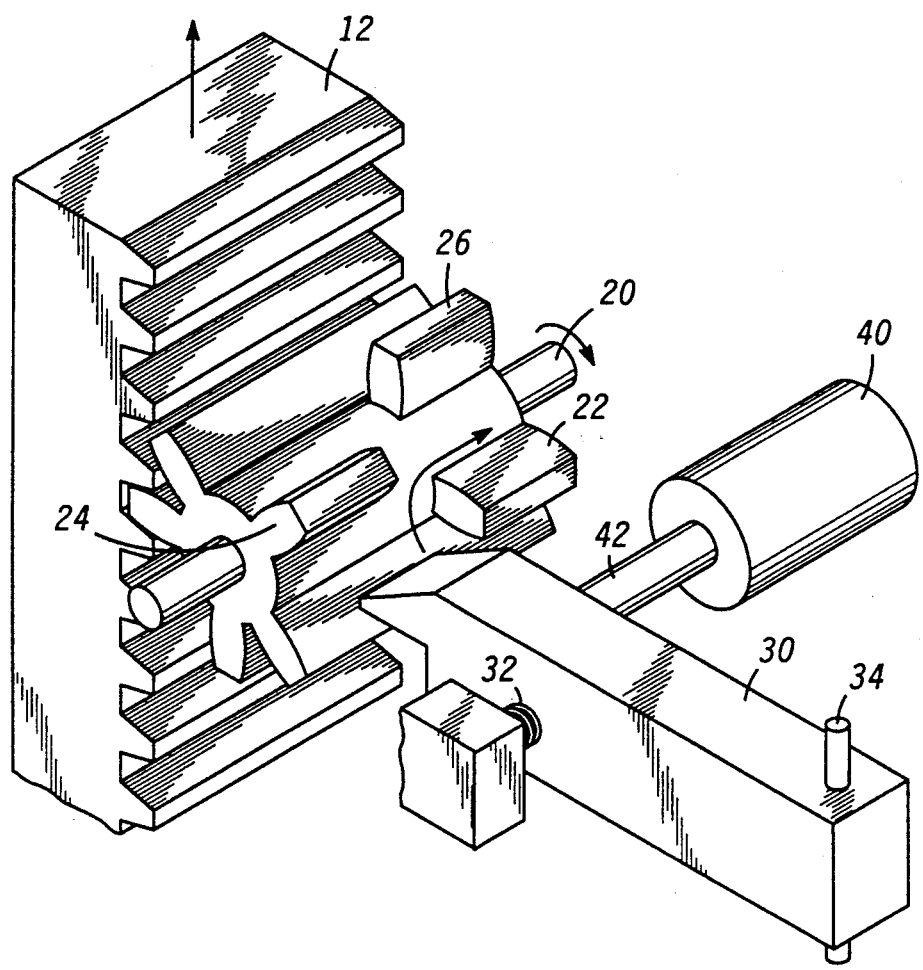
FIG. 2 shows the first unlock position of the interlock release mechanism according to the present invention.
Figure 3:
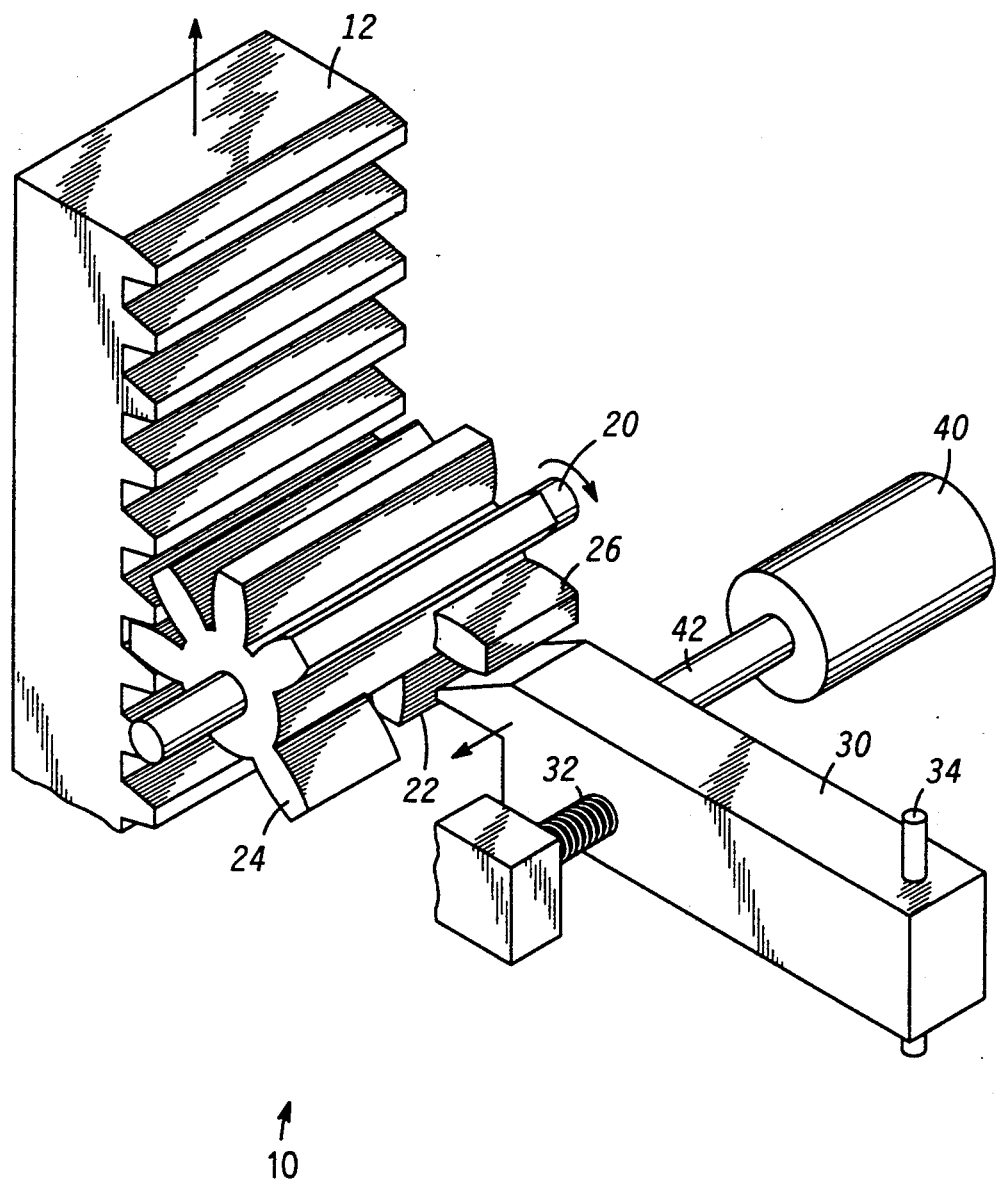
FIG. 3 shows the last lock position according to the present invention.

The subject invention uses a toothed pinion engaging a toothed rack or a gear. The teeth of the pinion are removed in certain areas so a lock arm, when moved axially from in alignment with a tooth segment to where the tooth has been removed, permits the pinion to be rotated by the rack. The rack and the lock arm must be operated in the correct sequence or the lock arm will be jammed. With the correct sequence of lock arm motion and pinion rotation by the rack or gear, the rack or gear may be moved to achieve the desired release action of the subject invention. The Interlocked Release Mechanism as shown in FIGS. 1, 2 and 3 is comprised of only a few parts for simplicity and reduced cost of construction.

Figure 1:
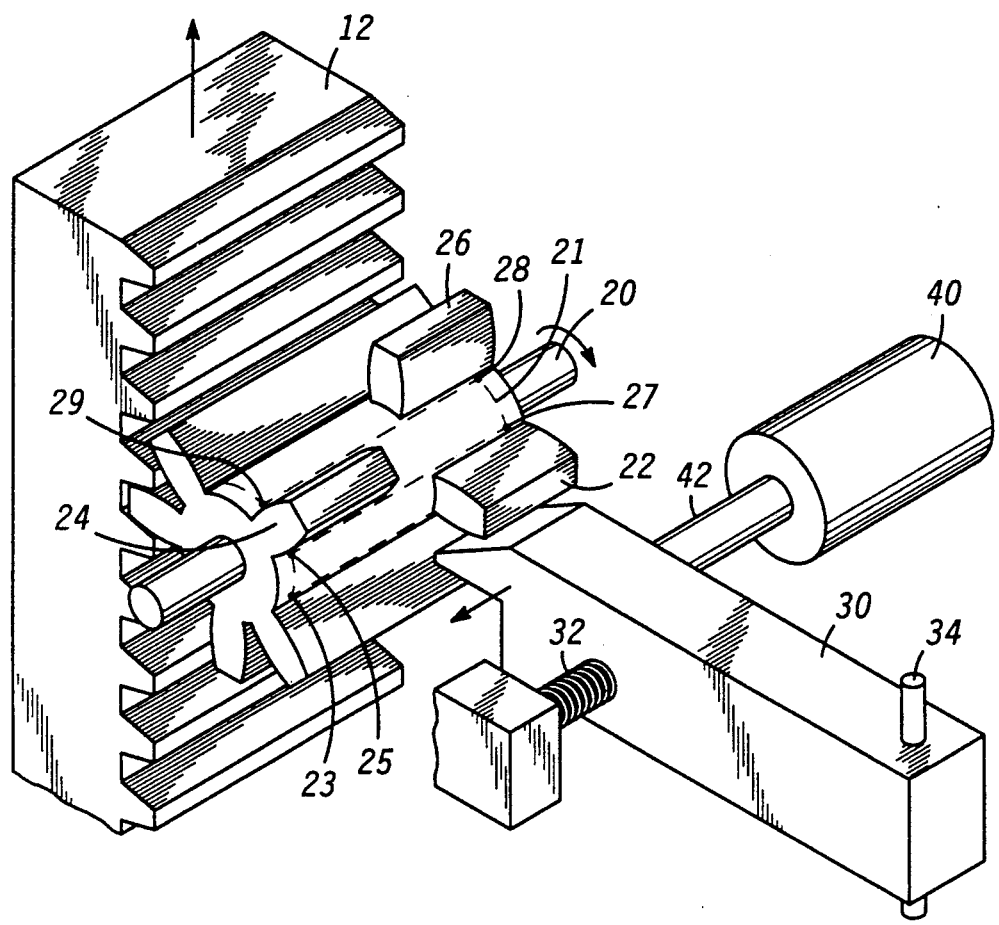
FIG. 1 is an isometric view of an interlocked release mechanism in its "safe" initial position according to the present invention.

FIG. 1 shows an interlock mechanism 10 which provides locking of a mechanical device. Interlock mechanism 10 cannot be compromised by random electrical pulses nor from shock or vibration.

Interlock mechanism 10, in its preferred embodiment, comprises rack 12 (which may also be a gear), pinion 20, lock arm 30, spring 32, pivot pin 34, and solenoid 40.

In its initial, locked position, pinion 20 engages rack 12 and is locked into position by lock arm 30. Specifically, a tooth segment 22 abuts lock arm 30. It should be noted that rack 12 is locked into position initially and does not apply any pressure against pinion 20. Therefore, although tooth segment 22 abuts lock arm 30, no pressure is exerted onto lock arm 30. Any pressure applied by tooth segment 22 onto lock arm 30 causes jamming of interlock mechanism 10.

Lock arm 30 is engaged by solenoid 40. During operation, plunger 42 of solenoid 40 will push horizontally against lock arm 30. Spring 32 applies a return force against lock arm 30 opposite in direction to the force applied by solenoid 40. Spring 32 restores lock arm 30 to its initial state after operation of solenoid 40.

Lock arm 30 pivots about pivot 34 as the forces in solenoid 40 and spring 32 move lock arm 30 back and forth. Specifically, solenoid 40 pushes against lock arm 30 pivoting lock arm 30 into spring 32. Spring 32 is compressed generating a counter-force against lock arm 30. When solenoid 40 is deactivated, the force in spring 32 pushes lock arm 30 back into its original position.

The sequence of operation of interlock mechanism 10 is as follows. The dotted line 21 on pinion 20 indicates the path followed by lock arm 30 throughout the operation of interlock mechanism 10.

1) Solenoid 40 is activated and pushes lock arm 30 away from blocking tooth segment 22 to a position blocking tooth segment 24 (point 23). Solenoid 40 holds lock arm 30 in this position. In this position, spring 32 is in compression.

2) Rack 12 is moved upward one tooth. At this point, tooth segment 24 is brought contiguous to lock arm 30 with a nominal clearance (point 25). Again, any pressure exerted by tooth segment 24 onto lock arm 32 will cause jamming of mechanism 10.

3) Solenoid 40 is deactivated and spring 32 returns lock arm 30 to its initial position. Lock arm 30 has now moved to the opposite side of tooth segment 22 as shown by dotted line 21 (point 27). This movement is shown in FIG. 2.

4) Referring again to FIG. 1, rack 12 moves upward one tooth bringing lock arm 30 adjacent to tooth segment 26 (point 28). A nominal clearance exists between lock arm 30 tooth segment 26.

5) Solenoid 40 is again activated and pushes lock arm 30 away from blocking tooth segment 26 to a position behind tooth segment 24 (point 29) as shown in FIG. 3. Solenoid 40 holds lock arm 30 in this position.

6) Again in FIG. 1, rack 12 is moved one tooth upward to its final position. Solenoid 40 is deactivated allowing spring 32 to bring lock arm 30 to its initial position and behind tooth segment 26. At this point, interlock mechanism 10 has passed through its entire cycle.

The preferred embodiment has shown interlock mechanism as cycling through 3 teeth. Various combinations of tooth rotations may be designed into interlock mechanism 10. This specific three-tooth application is useful in the mechanism shown in FIG. 4.

Figure 4:
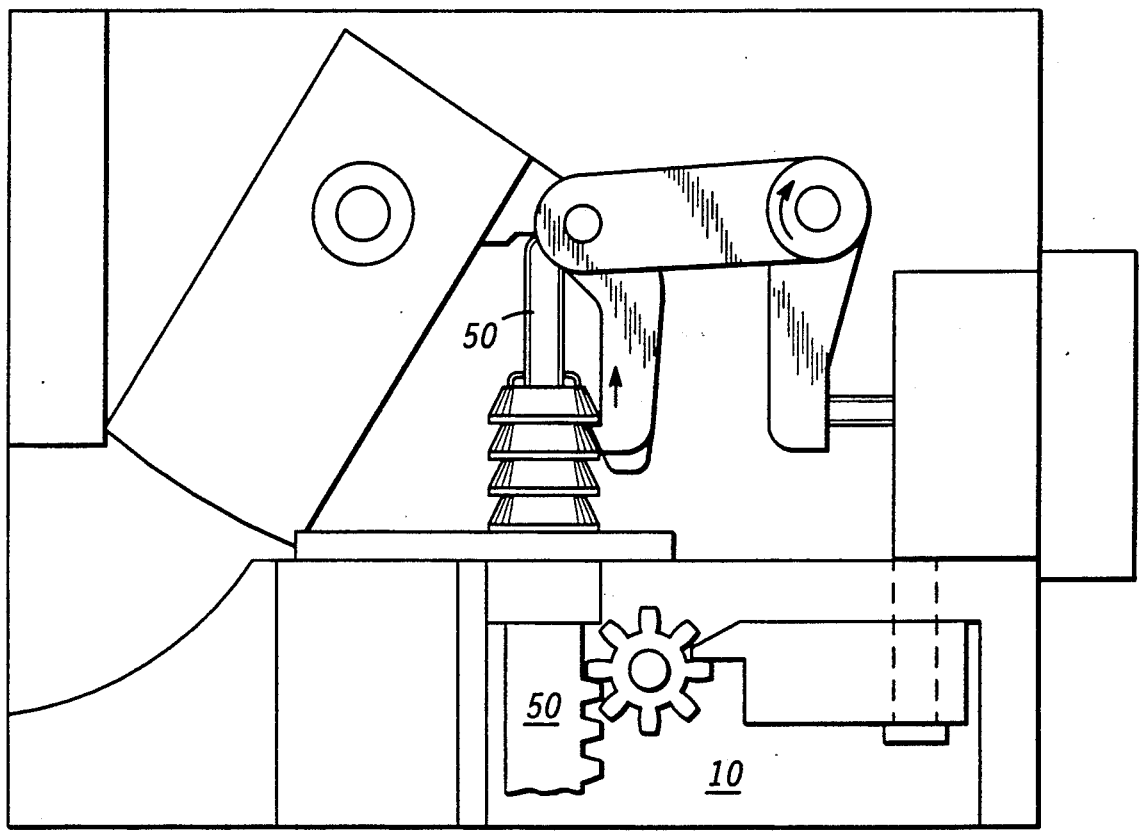
FIG. 4 shows the interlocked release mechanism incorporated into a safe and arm device.

The safe and arm device of FIG. 4 incorporates interlock mechanism 10. The rack 12 is a plunger post 50 operated as described in a U.S. patent application having Ser. No. 456,396. FIG. 4 also shows an actuator, a solenoid in the upper right and a detonating element residing in a chamber in the upper left which is connected to the plunger assembly. Interlock mechanism 10 operates as an additional lock to the safe and arm device shown.

Solenoid 40 may be powered from a wind driven generator to supply environmental energy for operation of interlock mechanism 10. Solenoid 40 may be replaced with a pneumatic, hydraulic, or other mechanical device.

Figure 5:
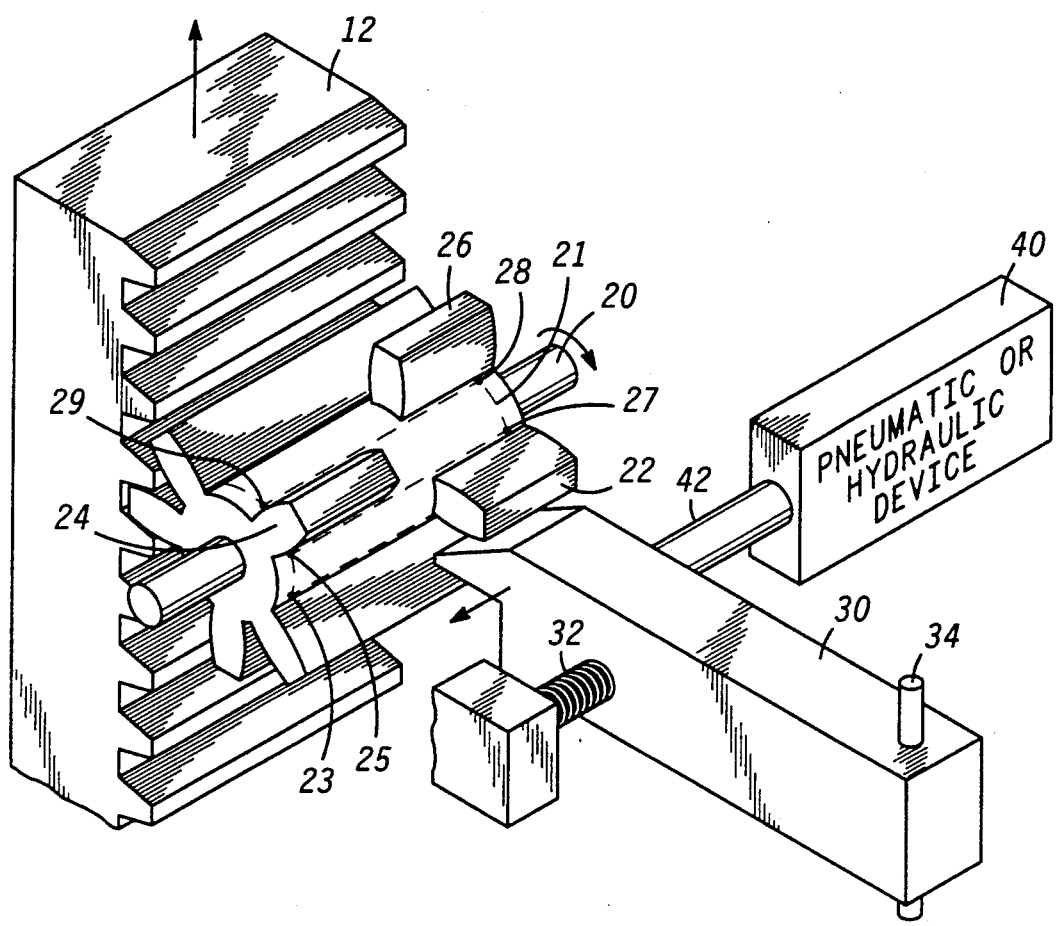
FIG. 5 shows an isometric view of an interlocked mechanism employing a pneumatic or hydraulic device actuator.

With the correct sequence of operation of lock arm 30 and pinion 20 with rack 12, rack 12 may be moved to achieve the desired release action of interlock mechanism 10. Furthermore, only a few parts are required for interlock mechanism 10 adding simplicity and reduced cost of construction. Interlock mechanism 10 is thus a very reliable, additional safety device to fulfill the requirements for safe and arm devices on munitions. FIG. 5 depicts the interlock mechanism with a pneumatic or hydraulic actuator.

Thus there has been provided, in accordance with the present invention, an interlock release mechanism that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A release mechanism for a dependent lock of a safe and arming device of a fuze comprising:
   a toothed member;
   a toothed pinion;
   teeth of said pinion engaging teeth of said toothed member;
   a predetermined number of said teeth of said pinion partially removed in a predetermined pattern;
   locking means for preventing said pinion from rotating;
   said locking means travelling about said predetermined pattern of said pinion teeth to allow rotation of said pinion; and
   said toothed member releasing said locking means of said safe and arming device from a safe position of said safe and arming device after said locking means has travelled through said predetermined pattern.

2. A release mechanism according to claim 1 wherein said locking means comprises:
   lock member, a first end of said lock member travelling through said predetermined pattern;
   said lock member pivoting about a second end of said lock member; and
   means for moving said lock member back and forth along a single plane.

3. A release mechanism according to claim 2 wherein said means for moving comprises:
   an activator;
   said activator coupled to a first side of said first end of said lock member to pivot said lock member about said second end; and
   a spring coupled to a second side of said lock member to pivot said lock member about said second end.

4. A release mechanism according to claim 3 wherein said means for moving further comprises a spring coupled to a second side of said first end to supply a return force against said lock member.

5. A release mechanism according to claim 3 wherein said activator comprises a solenoid.

6. A release mechanism according to claim 3 wherein said activator comprises a pneumatic device.

7. A release mechanism according to claim 3 wherein said activator comprises a hydraulic device.

8. A safe and arm device which operates without the use of stored energy comprises:
   plunger means;
   actuator means for moving said plunger means in successive motions;
   chamber means for storing a detonating element;
   said plunger means for supplying a force to said chamber means;
   said plunger means contacting said chamber means and causing said chamber means to align into an arm position when said force applied to said chamber means reaches a predetermined magnitude;
   said actuator means repeatedly coupling said plunger means; and
   release safety mechanism coupled to said plunger means.

9. A safe and arm device according to claim 8 wherein said release safety mechanism comprises:
   a toothed member coupled to said plunger means;
   a toothed pinion;
   teeth of said pinion engaging teeth of said toothed member;
   a predetermined number of said teeth of said pinion partially removed in a predetermined pattern;
   locking means for preventing said pinion from rotating; and
   said locking means travelling about said predetermined pattern of said pinion teeth to allow rotation of said pinion.

10. A safe and arm device according to claim 9 wherein said locking means comprises:

lock member, a first end of said lock member travelling through said predetermined pattern;

said lock member pivoting about a second end of said lock member; and means for moving said lock member back and forth along a single plane.

11. A safe and arm device according to claim 10 wherein said means for moving comprises:

an activator;

said activator coupled to a first side of said first end of said lock member to pivot said lock member about said second end; and a spring coupled to a second side of said lock member to pivot said lock member about said second end.

12. A safe and arm device according to claim 11 wherein said means for moving further comprises a spring coupled to a second side of said first end to supply a return force against said lock member.

13. A safe and arm device according to claim 11 wherein said activator comprises a solenoid.

14. A safe and arm device according to claim 11 wherein said activator comprises a pneumatic device.

15. A safe and arm device according to claim 11 wherein said activator comprises a hydraulic device.

* * * * *